(12) United States Patent
Fliess et al.

(10) Patent No.: US 10,860,483 B2
(45) Date of Patent: Dec. 8, 2020

(54) HANDLING METADATA CORRUPTION TO AVOID DATA UNAVAILABILITY

(71) Applicant: EMC IP Holding Company LLC, Hopkinton, MA (US)

(72) Inventors: Leron Fliess, Kiryat Ono (IL); Nimrod Shani, Raanana (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/398,399

(22) Filed: Apr. 30, 2019

(65) Prior Publication Data

US 2020/0349072 A1 Nov. 5, 2020

(51) Int. Cl.
*G06F 12/00* (2006.01)
*G06F 12/0804* (2016.01)

(52) U.S. Cl.
CPC .. *G06F 12/0804* (2013.01); *G06F 2212/1021* (2013.01); *G06F 2212/262* (2013.01); *G06F 2212/608* (2013.01)

(58) Field of Classification Search
CPC ......... G06F 12/0804; G06F 2212/1021; G06F 2212/262; G06F 2212/608
See application file for complete search history.

(56) References Cited

U.S. PATENT DOCUMENTS

| 7,433,898 | B1 * | 10/2008 | Georgiev | G06F 11/203 |
| 7,873,619 | B1 | 1/2011 | Faibish et al. | |
| 8,095,577 | B1 | 1/2012 | Faibish et al. | |
| 8,285,758 | B1 * | 10/2012 | Bono | G06F 16/185 |
| | | | | 707/822 |
| 8,930,745 | B2 * | 1/2015 | Endo | G06F 11/1076 |
| | | | | 714/6.12 |
| 9,229,870 | B1 | 1/2016 | Kumar et al. | |
| 9,916,244 | B1 | 3/2018 | Tolvanen et al. | |
| 10,127,156 | B1 | 11/2018 | Yan et al. | |
| 10,175,894 | B1 | 1/2019 | Visvanathan et al. | |
| 10,204,002 | B1 | 2/2019 | Visvanathan et al. | |
| 10,216,630 | B1 | 2/2019 | Shang et al. | |
| 10,235,066 | B1 | 3/2019 | Chen et al. | |
| 10,417,137 | B2 | 9/2019 | Li et al. | |
| 10,514,865 | B2 | 12/2019 | Bassov et al. | |
| 10,620,850 | B1 | 4/2020 | Xu et al. | |

(Continued)

*Primary Examiner* — Mano Padmanabhan
*Assistant Examiner* — Mohammad S Hasan
(74) *Attorney, Agent, or Firm* — BainwoodHuang (57) ABSTRACT

A technique handles metadata corruption to avoid data unavailability. The technique involves performing metadata evaluation operations on metadata describing pages of written data in a data-log that holds data en route to volumes in secondary storage. The technique further involves, while results of the metadata evaluation operations indicate that there is no corrupt metadata, flushing the pages of written data from the data-log to the volumes in the secondary storage. The technique further involves, in response to a result of a particular metadata evaluation operation indicating that metadata for a particular page of written data in the data-log is corrupt, quarantining the particular page of written data from the data-log to a containment cache to enable further flushing of other pages of written data from the data-log to the volumes in the secondary storage.

20 Claims, 7 Drawing Sheets

(56) References Cited

U.S. PATENT DOCUMENTS

| | | |
|---|---|---|
| 10,705,918 B1 | 7/2020 | Hu et al. |
| 2005/0188279 A1* | 8/2005 | Gibble ............... G06F 11/1064 714/42 |
| 2011/0185113 A1* | 7/2011 | Goss .................. G06F 12/0253 711/103 |
| 2012/0030408 A1* | 2/2012 | Flynn .................. G06F 3/0688 711/102 |
| 2014/0006465 A1* | 1/2014 | Davis ................... G06F 16/183 707/827 |
| 2014/0189432 A1* | 7/2014 | Gokhale ............ G06F 11/1469 714/41 |
| 2016/0048428 A1* | 2/2016 | Kanteti .............. G06F 11/2082 707/646 |
| 2016/0070652 A1* | 3/2016 | Sundararaman ........ G06F 3/065 711/154 |
| 2016/0077972 A1* | 3/2016 | Pease .................. G06F 3/0674 711/141 |
| 2016/0110249 A1* | 4/2016 | Orme ................. G06F 11/1016 714/6.24 |
| 2017/0075965 A1* | 3/2017 | Liu ........................ G06F 16/27 |
| 2017/0286206 A1* | 10/2017 | Fischer-Toubol ..... G06F 11/076 |
| 2019/0102251 A1* | 4/2019 | Iyigun ................ G06F 11/1068 |
| 2020/0104059 A1* | 4/2020 | Hayes .................. G06F 3/0665 |

\* cited by examiner

HANDLING METADATA CORRUPTION TO AVOID DATA UNAVAILABILITY

BACKGROUND

A conventional data storage system stores host data into and loads host data from back-end storage on behalf of one or more host computers. When a host computer writes host data to the data storage system, the data storage system may temporarily hold the host data within a buffer before saving the host data to the back-end storage.

Once the host data has been saved to the back-end storage, the data storage system may reuse the space in the buffer that was occupied by the host data. If the host computer attempts to read the host data while the host data is still in the buffer, the data storage system may simply provide the host data from the buffer without needing to access the back-end storage for the host data.

SUMMARY

Unfortunately, there are deficiencies to the above described conventional data storage system. Along these lines, suppose that the buffer of the conventional data storage system is configured to operate as a transactional log of operations that are processed in a first-in, first-out (FIFO) manner to preserve write order for data consistency. In such a situation, the data storage system may temporarily store host input/output (I/O) requests in pages within the buffer and associate metadata with the pages to facilitate operation (e.g., to store target addresses for written data, etc.). However, if the metadata for a page becomes corrupted (e.g., due to a software bug, a hardware failure, etc.), the data storage system will stop processing pages from the buffer. Eventually, the buffer will fill up and the data storage system will crash resulting in data unavailability.

In contrast to the above-described data storage system situation in which the data storage system simply stops processing pages from the buffer when the data storage system encounters corrupted metadata, improved techniques are directed to handling metadata corruption in data storage equipment to avoid data unavailability. Such techniques involve processing pages of written data from a data-log based on respective metadata, and quarantining a page of written data along with a page of underlying metadata for that page of written data from the data-log to a containment cache if the page of underlying metadata is corrupt. The data-log may serve as a transactional log of operations (e.g., host I/O requests) which preserves write order and from which I/O requests are processed. With the page of written data and corresponding page of metadata quarantined from the data-log, the data storage equipment can continue processing other pages from the data-log. For example, suppose that the quarantined page of written data targets a particular family of volumes in secondary storage. In such a situation, the data storage equipment can continue processing pages containing written data en route to non-related volumes in secondary storage directly from the data-log. Additionally, the data storage equipment can quarantine further pages targeting the affected volume family to the containment cache until the corrupted metadata is restored. As a result, the data storage equipment may provide extended data availability (e.g., remain operational until the metadata restored, allow further processing through the data-log, etc).

One embodiment is directed to a method of handling metadata corruption to avoid data unavailability. The method includes performing metadata evaluation operations on metadata describing pages of written data in a data-log that holds data en route to volumes in secondary storage and, while results of the metadata evaluation operations indicate that there is no corrupt metadata, flushing the pages of written data from the data-log to the volumes in the secondary storage. The method further includes, in response to a result of a particular metadata evaluation operation indicating that metadata for a particular page of written data in the data-log is corrupt, quarantining the particular page of written data from the data-log to a containment cache to enable further flushing of other pages of written data from the data-log to the volumes in the secondary storage.

In some arrangements, the volumes in the secondary storage include a first family of volumes and a second family of volumes that is independent of the first family of volumes. Additionally, quarantining the particular page of written data includes ascertaining that the particular page of written data is en route to the first family of volumes, and moving the particular page of written data from the data-log to the containment cache. Such operation allows further flushing of pages of written data from the data-log to other families of volumes in the secondary storage such as to the second family of volumes.

In some arrangements, the method further includes, while the particular page of written data is quarantined in the containment cache, quarantining other pages of written data en route to the first family of volumes from the data-log to the containment cache. In some arrangements, the method further includes, while pages of written data en route to the first family of volumes are quarantined in the containment cache, retrieving a page that belongs to the first family of volumes from the secondary storage to satisfy a read operation that results in a read miss.

In some arrangements, the method further includes, while pages of written data en route to the first family of volumes are quarantined in the containment cache, retrieving a page that belongs to the first family of volumes from the containment cache to satisfy a read operation that results in a read hit.

In some arrangements, the method further includes, in response to recovery of the metadata for the particular page, flushing pages of written data from the containment cache to the first family of volumes.

In some arrangements, the method further includes, after the metadata for the particular page has been recovered and while pages of written data are being flushed from the containment cache to the first family of volumes, continuing to quarantine further pages of written data en route to the first family of volumes from the data-log to the containment cache.

In some arrangements, the method further includes, after the metadata for the particular page has been recovered and while pages of written data are being flushed from the containment cache to the first family of volumes, monitoring a current number of pages of written data remaining in the containment cache. Additionally, the method further includes, in response to the current number of pages of written data remaining in the containment cache dropping below a predefined threshold, temporarily blocking receipt of data from a set of host computers until all of the pages of written data remaining in the containment cache are flushed from the containment cache to the first family of volumes.

In some arrangements, the method further includes, in response to all of the pages of written data remaining in the containment cache being flushed from the containment cache to the first family of volumes, unblocking receipt of data from the set of host computers and closing the containment cache to prevent further quarantining of pages of written data en route to the first family of volumes.

In some arrangements, the method further includes, while pages of written data en route to the first family of volumes are quarantined in the containment cache, decreasing an input rate for receiving data en route to the first family of volumes from a set of host computers to prevent the containment cache from becoming full.

In some arrangements, the method further includes, while pages of written data en route to the first family of volumes are quarantined in the containment cache, maintaining an input rate for receiving data en route to the second family of volumes from a set of host computers to maintain quality of service to the second family of volumes.

In some arrangements, the data-log is disposed along a data path of a data storage assembly which is constructed and arranged to perform data storage operations on behalf of a set of host computers. Additionally, flushing the pages of written data from the data-log to the volumes in the secondary storage includes processing the pages of written data from the data-log in write order preserving manner along the data path.

In some arrangements, processing the pages of written data from the data-log in the write order preserving manner along the data path includes forwarding the pages of written data from the data-log in the write order preserving manner to a mapper circuit that manages the written data within the secondary storage in accordance with a mapped (redundant array of independent disk) RAID scheme.

In some arrangements, performing the metadata evaluation operations on the metadata describing the pages of written data in the data-log includes ascertaining whether individual metadata items for respective pages are intact. Each metadata item identifies an address to be written to enable the data storage equipment to determine whether a respective page should be involved in a deduplication operation, an overwrite operation or a new write operation. Such metadata items may be constructed and arranged to support binary searching in a binary tree (e.g., for quick mapping lookups).

Another embodiment is directed to data storage equipment which includes memory and control circuitry coupled to the memory. The memory stores instructions which, when carried out by the control circuitry, cause the control circuitry to:
  (A) perform metadata evaluation operations on metadata describing pages of written data in a data-log that holds data en route to volumes in secondary storage,
  (B) while results of the metadata evaluation operations indicate that there is no corrupt metadata, flush the pages of written data from the data-log to the volumes in the secondary storage, and
  (C) in response to a result of a particular metadata evaluation operation indicating that metadata for a particular page of written data in the data-log is corrupt, quarantine the particular page of written data from the data-log to a containment cache to enable further flushing of other pages of written data from the data-log to the volumes in the secondary storage.

Yet another embodiment is directed to a computer program product having a non-transitory computer readable medium which stores a set of instructions to handle metadata corruption to avoid data unavailability. The set of instructions, when carried out by computerized circuitry, causes the computerized circuitry to perform a method of:
  (A) performing metadata evaluation operations on metadata describing pages of written data in a data-log that holds data en route to volumes in secondary storage;
  (B) while results of the metadata evaluation operations indicate that there is no corrupt metadata, flushing the pages of written data from the data-log to the volumes in the secondary storage; and
  (C) in response to a result of a particular metadata evaluation operation indicating that metadata for a particular page of written data in the data-log is corrupt, quarantining the particular page of written data from the data-log to a containment cache to enable further flushing of other pages of written data from the data-log to the volumes in the secondary storage.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in handling metadata corruption to avoid data unavailability.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to handling metadata corruption in data storage equipment to avoid data unavailability. Such a technique involves processing pages of written data from a data-log based on respective metadata, and quarantining a page of written data along with a page of underlying metadata for that page of written data from the data-log to a containment cache if the page of underlying metadata is corrupt. The data-log may serve as a transactional log of operations (e.g., host I/O requests) which preserves write order and from which I/O requests are processed. With the page of written data along with its corresponding page of metadata quarantined from the data-log, the data storage equipment can continue processing other pages from the data-log. For example, suppose that the quarantined page of written data targets a particular family of volumes in secondary storage. In such a situation, the data storage equipment can continue processing pages containing written data en route to non-related volumes in secondary storage directly from the data-log. Additionally, the data storage equipment can quarantine further pages targeting the affected volume family to the containment cache until the corrupted metadata is restored. As a result, the data storage equipment may provide extended data availability (e.g., remain operational until the metadata restored, allow further processing through the data-log, etc).

Figure 1:
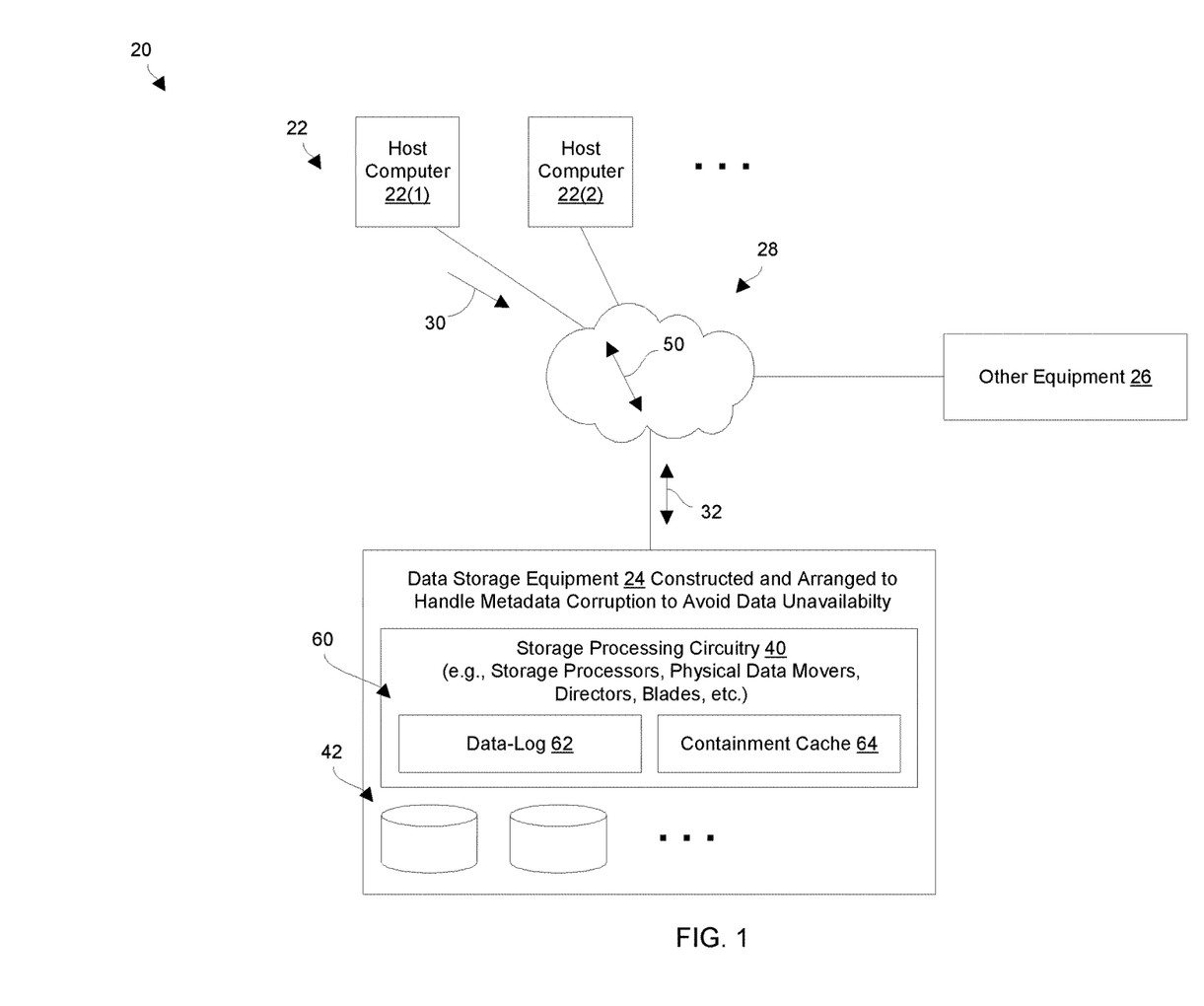
FIG. 1 is a block diagram of a data storage environment which handles metadata corruption to avoid data unavailability in accordance with certain embodiments.

FIG. 1 is a block diagram of a data storage environment 20 which handles metadata corruption to avoid data unavailability in accordance with certain embodiments. The data storage environment 20 includes host computers 22(1), 22(2), . . . (collectively, host computers 22), data storage equipment 24, other equipment 26, and a communications medium 28.

Each host computer 22 is constructed and arranged to perform useful work. For example, one or more of the host computers 22 may operate as a database server, a file server, a web server, an email server, an enterprise server, a transaction server, combinations thereof, and the like which provides host input/output (I/O) requests 30 to the data storage equipment 24. Other situations are suitable for use as well such as cluster configurations, server farms, cloud infrastructures, enterprise facilities, etc. In these contexts, the host computers 22 may provide a variety of different I/O requests 30 (e.g., block-based access requests, file access requests, combinations thereof, etc.) that direct the data storage equipment 24 to store host data 32 within and retrieve host data 32 from one or more data storage containers (e.g., a volume, a virtual volume or VVol, a logical unit of storage or LUN, a file, a file system, etc.).

The data storage equipment 24 includes storage processing circuitry 40 and storage devices 42 (e.g., solid state drives, magnetic disk drives, combinations thereof, etc.). The storage processing circuitry 40 is constructed and arranged to respond to the host I/O requests 30 from the host computers 22 by writing host data 32 into the storage devices 42 and reading host data 32 from the storage devices 42. The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 handles metadata corruption to avoid data unavailability (e.g., by quarantining pages from its data-log to a container cache to enable continued use of the data-log). During such operation, the storage processing circuitry 40 may provide a variety of specialized data storage system services such as tiering, prefetching, deduplication, compression, encryption, snapshotting, backup/archival services, replication, and so on.

It should be understood that the data storage equipment 24 make take a variety of different forms such as one or more disk array enclosures, rack mount equipment, electronic cabinets, data storage arrays, and/or assemblies, distributed equipment, combinations thereof, and so on. Moreover, the data storage equipment 24 is capable of performing different data storage operations, e.g., block-based operations, file-based operations, combinations thereof, etc.

The other equipment 26 represents additional apparatus that may form part of the data storage environment 20 such as service processors, user devices, terminals, enterprise apparatus, backup/archiving/replication sites, management tools and/or diagnostic equipment, other data storage systems, and so on. Such other equipment 26 may communicate with the host computers 22 and/or the data storage equipment 24.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting SAN-based communications, LAN-based communications, cellular communications, combinations thereof, etc.

During operation, the host devices 22 send host I/O requests 30 (e.g., SCSI/NVMe commands, file access commands, combinations thereof, etc.) to the data storage equipment 24 for processing. In response, the storage processing circuitry 40 of the data storage equipment 24 robustly and reliably performs host I/O operations such as writing host data 32 into and reading host data 32 from the storage devices 42, i.e., secondary storage.

To support such activity, the storage processing circuitry 40 includes a data path having, among other things, cache memory 60 for holding data. For written data that is en route to the storage devices 42, the cache memory 60 temporarily buffers the written data in pages to facilitate certain features such as faster write acknowledgements, faster read access of the written data while the written data is still cached, etc.

In accordance with certain embodiments, the data storage equipment 24 is a log-structured system that processes data in time order. To this end, at least a portion of the cache memory 60 serves as a transactional data-log 62 (or simply "data-log" 62) which stores I/O requests as entries.

During operation, the storage processing circuitry 40 utilizes metadata to identify and describe entries within the data-log 62, i.e., page descriptor/page buffer pairs. In particular, each entry may include metadata to indicate a particular target address (e.g., the page descriptor) and written data (e.g., the page buffer). In accordance with certain embodiments, the storage processing circuitry 40 is able to determine how to further process the written data based on the target address (e.g., whether the written data is for deduplication, overwriting existing data, or new data). In some arrangements, the metadata may be accessed quickly in a binary search tree arrangement.

It should be understood that, if the metadata for a particular entry is corrupt, the storage processing circuitry 40 is able to identify a particular family of volumes in secondary storage that relies on the particular entry and quarantine the particular entry to a containment cache 64. In particular, the storage processing circuitry 40 enables (or opens) the containment cache 64 for use, removes the particular entry from the data-log 62 and places that entry into the containment cache 64 thus enabling the data-log 62 to continue buffering new entries such as those containing written data en route to other families of volumes in secondary storage.

If additional entries to the particular family of volumes are added to the data-log 62 after the particular entry is quarantined, the storage processing circuitry 40 quarantines the additional entries from the data-log into the containment cache 64 as well. Such operation allows processing of entries in the data-log 62 to continue and prevents the data-log 62 from filling up completely.

Once the metadata for the particular entry is restored, the storage processing circuitry 40 processes the entries for the particular family of volumes from the containment cache 64 until the containment cache 64 is empty. Such processing of entries from the containment cache 64 may occur while the storage processing circuitry 40 processes entries from the data-log 62. At that point, the storage processing circuitry 40 terminates use of the containment cache 64 (e.g., disables or closes the containment cache 64) and returns to simply processing entries from the data-log 62.

It should be understood that are variety of techniques are suitable for restoring the metadata. Suitable techniques include computerized consistency check operations (e.g., FSCK) to automatically recover or reconstruct the metadata, manual fixing, and so on.

In some arrangements, if the containment cache 64 is filling at a fast rate, the input rate at which written data is received by the data storage equipment 24 may be slowed (e.g., throttled). Such operation prevents the containment cache 64 from becoming completely filled before the metadata is restored.

Based on the above described operation, processing of entries from the data-log 62 does not stop and the data storage equipment 24 remains operational. Moreover, the data storage equipment 24 is equipped to process read operations, e.g., where data is read from either the data-log 62 or the containment cache 64 (read hits) or read from secondary storage (read misses). Further details will now be provided with reference to FIG. 2.

Figure 2:
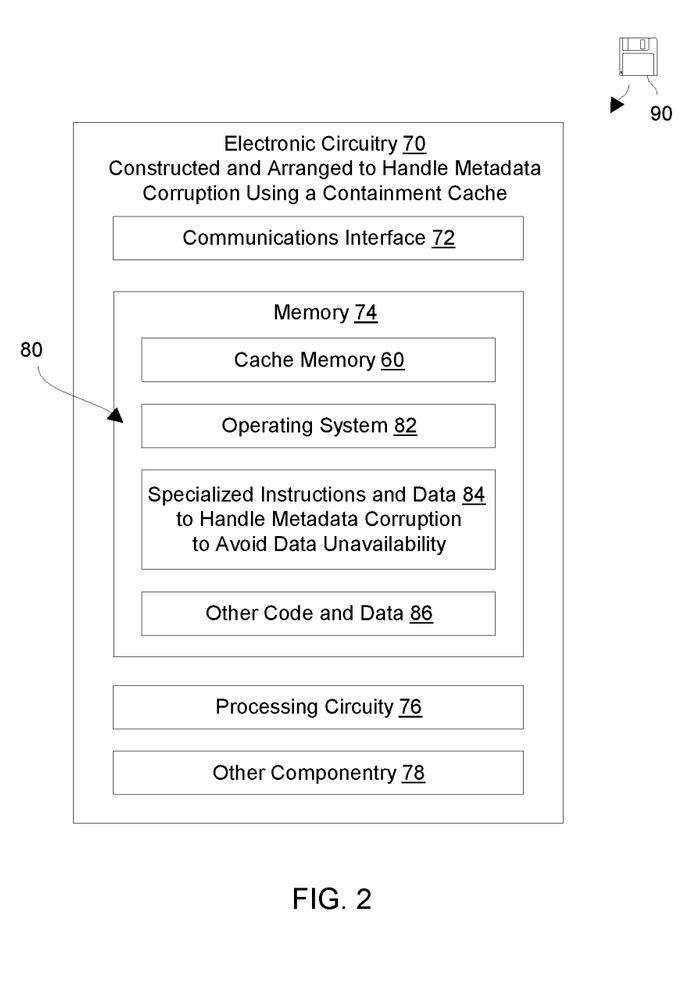
FIG. 2 is a block diagram of particular electronic circuitry of the data storage environment of FIG. 1 in accordance with certain embodiments.

FIG. 2 shows electronic circuitry 70 which is suitable for use within the data storage environment 20 in accordance with certain embodiments. Along these lines, the electronic circuitry 70 may form at least a portion of the storage processing circuitry 40 which handles metadata corruption using the containment cache 64 to avoid data unavailability (also see FIG. 1). The electronic circuitry 70 includes a communications interface 72, memory 74, and processing circuitry 76, and other componentry 78.

The communications interface 72 is constructed and arranged to connect the electronic circuitry 70 to the communications medium 28 (also see FIG. 1) to enable communications with other devices of the data storage environment 20 (e.g., the other equipment 26, the host computers 22, etc.). Such communications may be SAN-based, IP-based, cable-based, fiber-optic based, wireless, combinations thereof, and so on. Accordingly, the communications interface 72 enables the electronic circuitry 70 to robustly and reliably communicate with other external apparatus.

The memory 74 is intended to represent both volatile storage (e.g., DRAM, SRAM, etc.) and non-volatile storage (e.g., flash memory, magnetic memory, etc.). The memory 74 includes the cache memory 60 and stores a variety of software constructs 80 including an operating system 82, specialized instructions and data 84, and other code and data 86. The operating system 82 refers to particular control code such as a kernel to manage computerized resources (e.g., processor cycles, memory space, etc.), drivers (e.g., an I/O stack), and so on. The specialized instructions and data 84 refers to code that enables the electronic circuitry 70 to operate the cache memory 60 and to handle corrupt metadata by quarantining entries from the data-log 62 to the containment cache 64 to avoid data unavailability (also see FIG. 1). In some arrangements, the specialized instructions and data 84 is tightly integrated with or part of the operating system 82 itself. The other code and data 86 refers to applications and routines to provide additional operations and services (e.g., configuration tools, etc.), user-level applications, administrative tools, utilities, and so on.

In some arrangements, at least a portion of the memory 74 is formed by some of the storage devices 42 (FIG. 1). In some arrangements, at least a portion of the memory 74 is separate and distinct from the storage devices 42.

The processing circuitry 76 is constructed and arranged to operate in accordance with the various software constructs 80 stored in the memory 74. As will be explained in further detail shortly, the processing circuitry 76 executes at least some of the specialized instructions and data 84 to form specialized circuitry which operates on the data-log 62, e.g., flushes pages from the data-log 62, quarantines pages connected with corrupt metadata from the data-log 62 to the containment cache 64, flushes pages from the containment cache 64 following metadata recovery, etc.

Such processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 70. In particular, the computer program product 90 has a non-transitory (or non-volatile) computer readable medium which stores a set of instructions which controls one or more operations of the electronic circuitry 70. Examples of suitable computer readable storage media include tangible articles of manufacture and apparatus which store instructions in a non-volatile manner such as DVD, CD-ROM, flash memory, disk memory, tape memory, and the like.

The other componentry 78 refers to other hardware of the electronic circuitry 70. Along these lines, the electronic circuitry 70 may include one or more storage bus interfaces, a user interface, specialized graphics hardware, etc. Further details will now be provided with reference to FIGS. 3 through 5.

Figure 3:
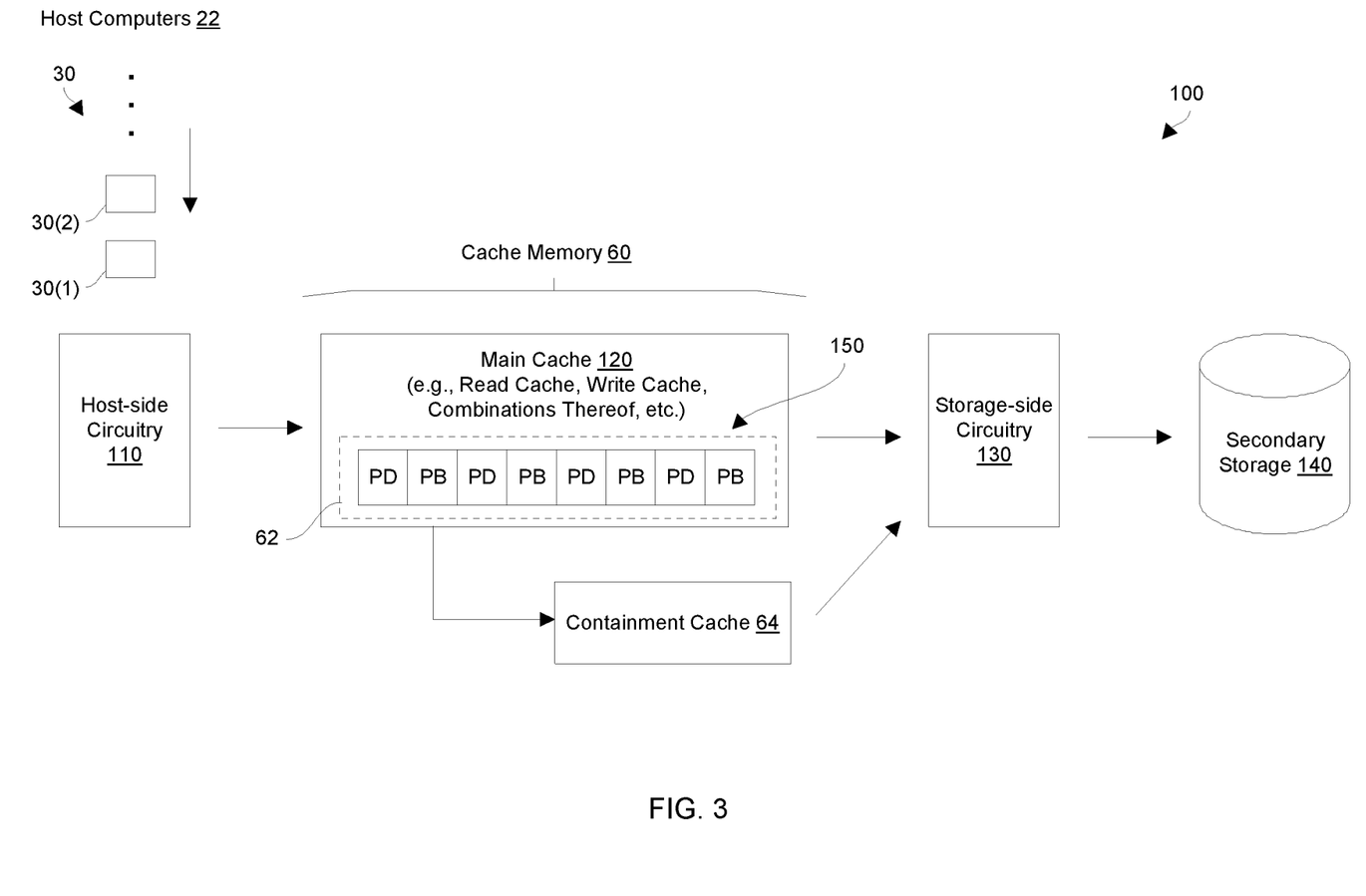
FIG. 3 is a block diagram illustrating particular data path details in accordance with certain embodiments.
Figure 4:
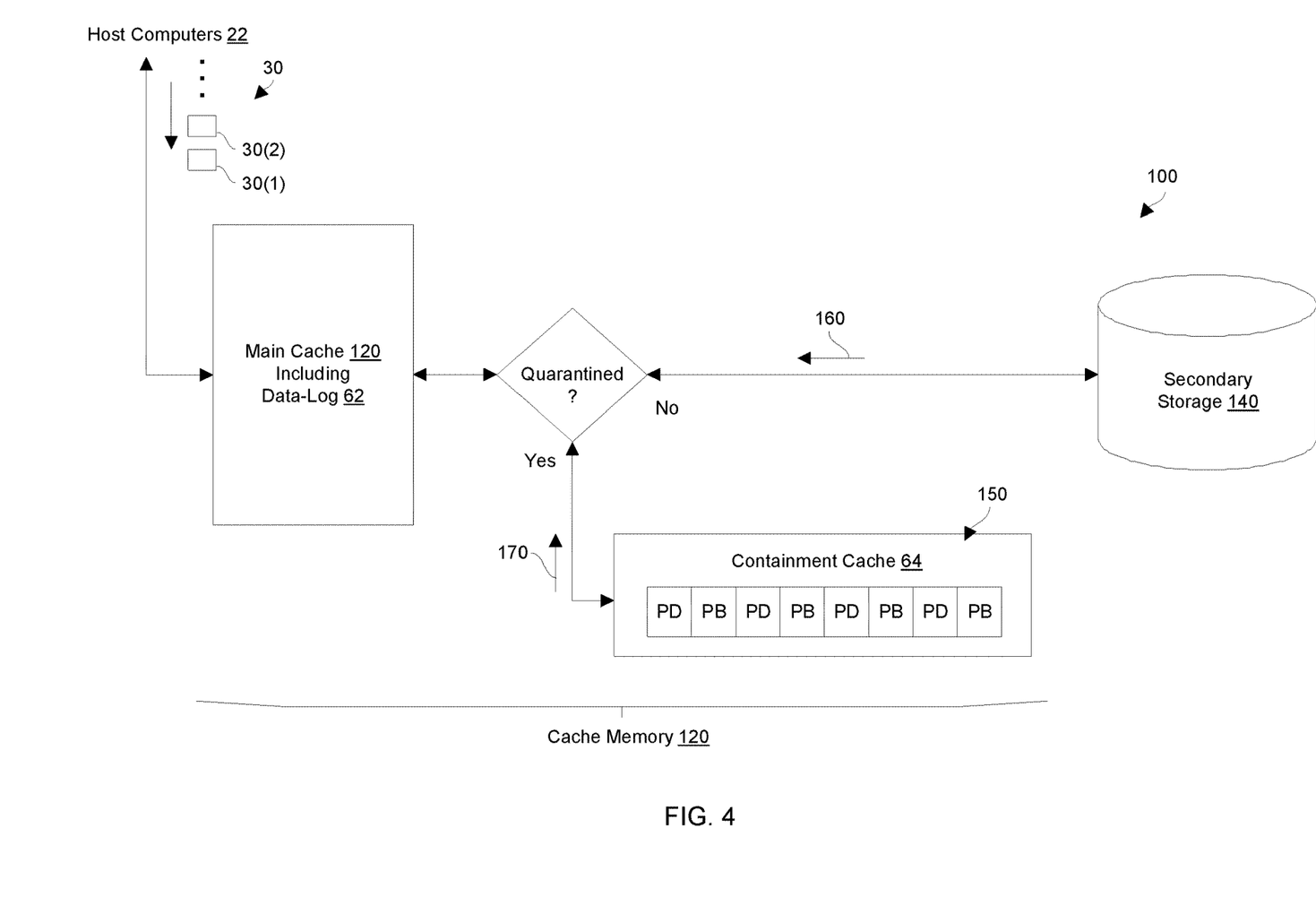
FIG. 4 is a block diagram illustrating particular read flow details in accordance with certain embodiments.
Figure 5:
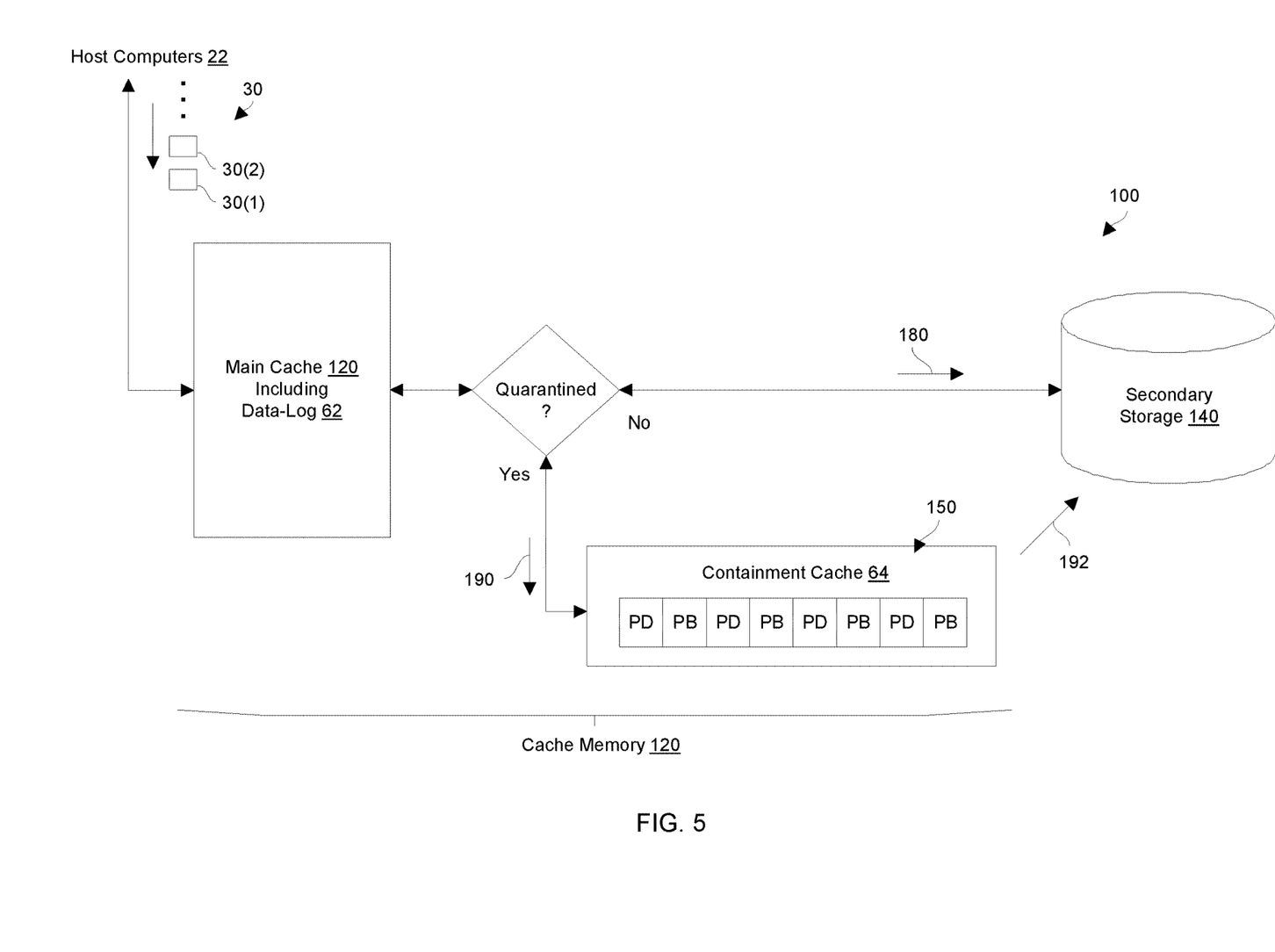
FIG. 5 is a block diagram illustrating particular write flow details in accordance with certain embodiments.

FIGS. 3 through 5 illustrate particular details regarding operation of the data storage equipment 24 in accordance with certain embodiments. FIG. 3 shows general details of a data path 100 of the data storage equipment 24. FIG. 4 shows certain read flow details in accordance with certain embodiments. FIG. 5 shows certain write flow details in accordance with certain embodiments.

As shown in FIG. 3, the data path 100 of the data storage equipment 24 includes host-side circuitry 110, a main cache 120, storage-side circuitry 130, and secondary storage 140. The host-side circuitry 110 and/or the storage-side circuitry 130 may be formed by the processing circuitry 76 operating in accordance with the software constructs 80 (also see FIG. 2).

The host-side circuitry 110 performs various host-side (or higher host-side level) operations such as interfacing with host computers 22 (FIG. 1), security, file and/or volume identification, etc. The main cache 120 supports write and read operations by temporarily caching data en route to the secondary storage 140 as well as data loaded from the secondary storage 140. The storage-side circuitry 130 performs storage-side (or lower storage-side level) operations such as mapping, block deduplication, implementing RAID (redundant array of independent disks), etc. The secondary storage 140 provides non-volatile storage (also see the storage devices 42 in FIG. 1). In some arrangements, at least some of the secondary storage 140 is formed by solid state devices (SSDs).

The main cache 120 and the earlier-mentioned container cache 64 belong to the cache memory 60 (also see FIGS. 1 and 2). The main cache 120 includes, or may be partitioned into, one or more smaller caches such as one or more read caches and one or more write caches. Along these lines, the earlier-mentioned data-log 62 (also see FIG. 1) forms at least part of the main cache 120. As illustrated in FIG. 3, the data-log 62 holds written data received from the host computers 22 in entries 150.

During operation, the host computers 22 provide a series of host I/O requests 30(1), 30(2), ... (collectively, host I/O requests 30) to the data storage equipment 24 for processing (also see FIG. 1). The data path 100 operates as a log-structured system by enabling data to be processed in time order. Along these lines, the data-log 62 serves as a transactional data-log for the host-side circuitry 110 and the storage-side circuitry 130.

During such operation, the host-side circuitry 110 and/or the storage-side circuitry 130 process the host I/O requests 30 into entries 150, e.g., page descriptor/page buffer pairs or any other data arrangement. Each page descriptor (PD) of such a pair holds relevant metadata for the page buffer (PB) of that pair, and each page buffer (PB) holds actual written data (i.e., the actual page) en route to the secondary storage 140. Such metadata facilitates further processing of the written data such as indicating the requested address to be written. In some arrangements, at least some of the metadata is organized as traversable entries for searching purposes (e.g., constructed and arranged to support binary searching in a binary tree for quick mapping lookups).

Once the data-log 62 is full of entries 150 or a predefined threshold is reached, the storage-side circuitry 130 begins flushing the written data from the data-log 62 into the secondary storage 140. In particular, for the entry 150 in write (or time) order, the storage-side circuitry 130 determines, based on the metadata of the page descriptor of that entry 150, whether the data in the page buffer of that entry 150 should be involved in a deduplication operation, an overwrite operation or a new write operation. The storage-side circuitry 130 then processes that entry 150 to make room in the data-log 62 for a new entry 150, and moves to the next entry 150 in the write order.

If the metadata for a particular entry 150 is corrupt, the host-side circuitry 110 and the storage-side circuitry 130 operate to allow the data path 100 to continue operating and process other written data. Along these lines, the storage-side circuitry 130 identifies which family of volumes within the secondary storage 140 is targeted by the particular entry 150 (i.e., the unhealthy page descriptor/page buffer pair), and quarantines the particular entry 150 to the containment buffer 64. In particular, the storage-side circuitry 130 notes which family of volumes is affected, opens the containment cache 64 for use, and moves the particular entry 150 from the data-log 62 into the containment cache 64.

Once the particular entry 150 has been removed from the data-log 62, the storage-side circuitry 130 is able to process further entries 150 from the data-log 62. In particular, any page descriptor/page buffer pairs that target volumes within the secondary storage 140 other than the affected family of volumes are processed in normal write order as usual. However, if the storage-side circuitry 130 encounters further page descriptor/page buffer pairs targeting the affected family of volumes, the storage-side circuitry 130 quarantines those entries 150 from the data-log 62 to the containment cache 64.

Such operation allows the data path 100 to continue to process host I/O requests 30 from the host computers 22. Furthermore, such operation may continue while other page descriptor/page buffer pairs targeting the affected family of volumes within the secondary storage 140 are moved to the containment cache 64.

It should be understood that there are various ways to slow the rate that the containment cache 64 fills with page descriptor/page buffer pairs. In some arrangements, the host-side circuitry 110 reduces the input rate of host I/O requests 30 for the affected family of volumes thus enabling the data path 100 to continue processing host I/O requests 30 to all other volumes in a normal manner. Other ways of slowing the fill rate of the containment cache 64 include adjusting thresholds, adding capacity to the containment cache 64 as necessary, and so on.

At some point, the metadata is restored (i.e., fixed). For example, the metadata may be recovered via FSCK operation, recomputed by replaying changes from competent data, manually fixed, and so on.

Once the metadata is restored, the storage-side circuitry 130 processes entries 150 from the containment cache 64. Such processing from the containment cache 64 may be performed concurrently with processing entries 150 from the data-log 62 since the storage-side circuitry 130 continues to quarantine any entries 150 to the affected family of volumes. Accordingly, the data-log 62 flushing is allowed to continue.

Once the number of entries 150 within the containment cache 64 falls to a predefined level (e.g., reaches or falls below a predefined threshold), the storage-side circuitry 130 directs the host-side circuitry 110 to temporarily block further filling of the data-log 62, and flushes the remaining entries 150 from the containment cache 64.

Once all of the remaining entries 150 have be flushed from the containment cache 64, the storage-side circuitry 130 closes the containment cache 64, and directs the host-side circuitry 110 to allow further filling of the data-log 62. Accordingly, all entries 150 are now processed from the data-log 62 as usual. That is, all written data en route to the secondary storage 140 is again processed normally from the data-log 62, and the data storage equipment remained up and running at all times.

It should be understood that the host-side circuitry 110 may block further filling of the data-log 62 by simply stopping incoming write commands for a short period of time. The predefined level that triggers locking the data-log 62 may be set to a low enough level that the amount of time the data-log 62 is locked is undetectable by the host computers 22.

FIG. 4 shows, in accordance with certain embodiments, particular details as to how the data path 100 operates to handle read commands while the containment cache 64 holds written data en route to the affected family of volumes in the secondary storage 140. In particular, recall that the storage-side circuitry 130 (FIG. 3) may quarantine entries (i.e., page descriptor/page buffer pairs) from the data-log 62 to the containment cache 64 in response to detection of corrupted metadata.

At this time, the data-log 62 of the main cache 120 may hold written data en route to the secondary storage 140 as well. In particular, the data-log 62 may hold page descriptor/page buffer pairs to volumes other than the affected family of volumes. Additionally, the data-log 62 may hold page descriptor/page buffer pairs to the affected family of volumes that the storage-side circuitry 130 has not yet quarantined to the containment cache 64.

The host-side circuitry 110 and/or the storage-side circuitry 130 may satisfy read commands from cache memory 60 (hit) or from the secondary storage 140 (miss) (also see FIG. 3). For example, suppose that a read command attempts to read data from an unaffected volume in the secondary storage 140. In such a situation, if the data is in the main cache 120, the host-side circuitry 110 provides the data from the data-log 62 to satisfy the read command. However, if the data is not in the data-log 62, the storage-side circuitry 130 retrieves the data from the secondary storage 140 to satisfy the read command (arrow 160 in FIG. 4).

As another example, suppose that a read command attempts to read data from the affected family of volumes in the secondary storage 140. In such a situation, if the data is in the data-log 62 because the storage-side circuitry 130 has not yet quarantined the corresponding page descriptor/page buffer pair(s) to the containment cache 64, the host-side circuitry 110 provides the data from the data-log 62 to satisfy the read command. Furthermore, if the data is in not the data-log 62, the containment cache 64 is checked for the data and the data is provided from the containment cache 64 to satisfy the read command if the data is there (arrow 170). However, if the data is not in the data-log 62 or in the containment cache 64 (miss), the storage-side circuitry 130 retrieves the data from the secondary storage 140 (arrow 160) to satisfy the read command.

FIG. 5 shows, in accordance with certain embodiments, particular details as to how the data path 100 operates to handle write commands while the containment cache 64 holds entries 150 of written data en route to the affected family of volumes in the secondary storage 140. As mentioned earlier, recall that the storage-side circuitry 130 (FIG. 3) may quarantine entries 150 (also see FIG. 3), i.e., page descriptor/page buffer pairs, from the data-log 62 of the main cache 120 to the containment cache 64 in response to detection of corrupted metadata.

Since the data path 100 is configured to preserve write order, the host-side circuitry 110 (FIG. 3) may acknowledge write commands while the written data is stored into the data-log 62 (and perhaps mirrored to another cache for redundancy). If the written data is for the affected family of volumes, the entries 150 are then quarantined from the data-log 62 to the containment cache 64. However, if the written data is not for the affected family of volumes but is targeted to other volumes that are independent of the affected family of volumes, the written data is processed from the data-log 62 to the secondary storage 140 in a normal manner (arrow 180). Along these lines, the storage-side circuitry 130 processes the page descriptor/page buffer pairs from the data-log 62 by performing deduplication, overwriting existing data, or writing new data.

In some arrangements, the storage-side circuitry 130 operates the secondary storage 140 as a mapped RAID system.

However, suppose that a write command attempts to write data to the affected family of volumes in the secondary storage 140. In such a situation, the storage-side circuitry 130 has already determined that further entries 150 (i.e., page descriptor/page buffer pairs) should be quarantined to the containment cache 64. Accordingly, the storage-side circuitry 130 transfers the entries 150 targeting the affected family of volumes from the data-log 62 to the containment cache 64 (arrow 190). Accordingly, the data-log 62 continues to empty in a normal manner thus enabling the more entries 150 to be input high availability.

In some arrangements, the data path 100 may slow the input rate of written data that is targeted to the affected family of volumes. Such operation prevents the containment cache 64 from eventually becoming full.

Once the metadata has been recovered, the storage-side circuitry 130 processes the written data in the preserved write order from the containment cache 64 (arrow 192). In particular, the storage-side circuitry 130 may process page descriptor/page buffer pairs targeting the affected family of volumes from the containment cache 64 while also processing page descriptor/page buffer pairs from the main cache 150 (arrow 180). If the storage-side circuitry 130 encounters page descriptor/page buffer pairs targeting the affected family of volumes in the data-log 62, the storage-side circuitry 130 moves those page descriptor/page buffer pairs to the containment cache 64 to preserve the write order (arrow 190).

Once the number of entries 150 in the containment cache 64 drops to a low enough level, the data path 100 temporarily blocks input of further host I/O requests 30 and processes the remaining entries 150 from the containment cache 64 (arrow 192). The data path 100 then closes the containment cache 64, unblocks input of further host I/O requests 30, and processes all entries 150 through the data-log 62 in a normal manner (arrow 180).

In some arrangements, the level at which the data path 100 temporarily blocks input of further host I/O requests 30 to purge the containment cache 64 is set low enough so that the amount of time required to empty the containment cache 64 makes blocking seamless to the host computers 22. Further details will now be provided with reference to FIGS. 6 and 7.

Figure 6:
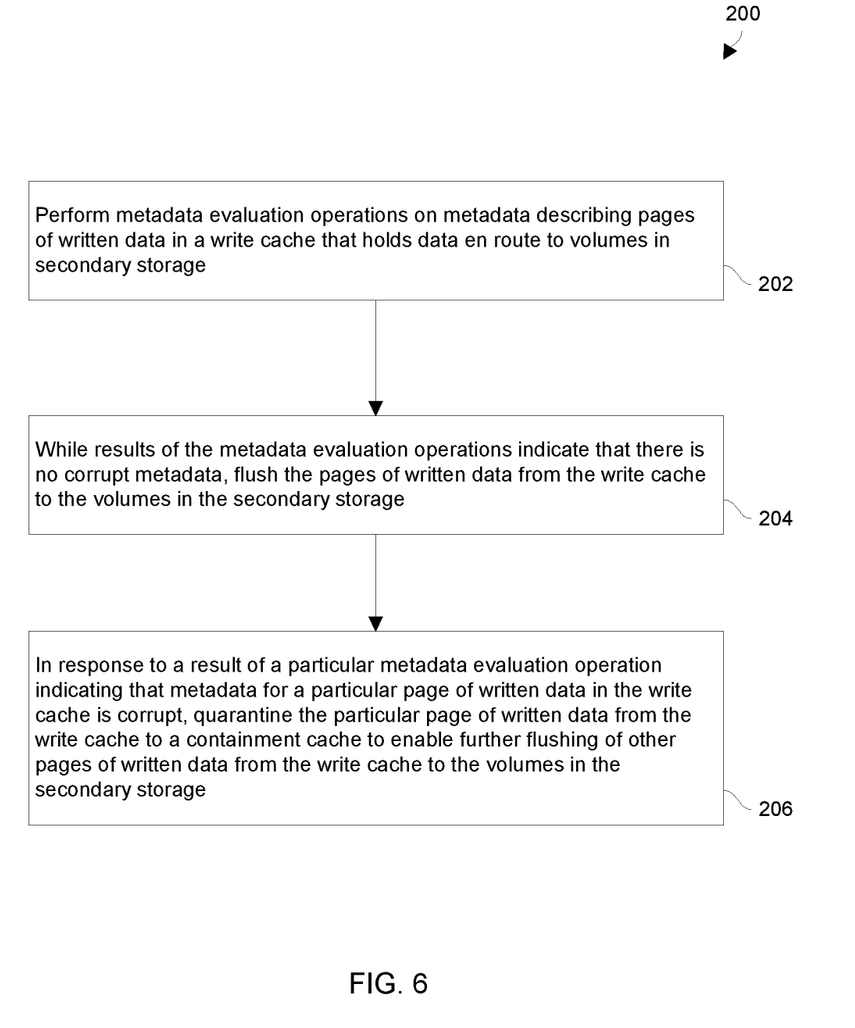
FIG. 6 is a flowchart of a procedure providing further details of the data storage environment of FIG. 1 in accordance with certain embodiments.
Figure 7:
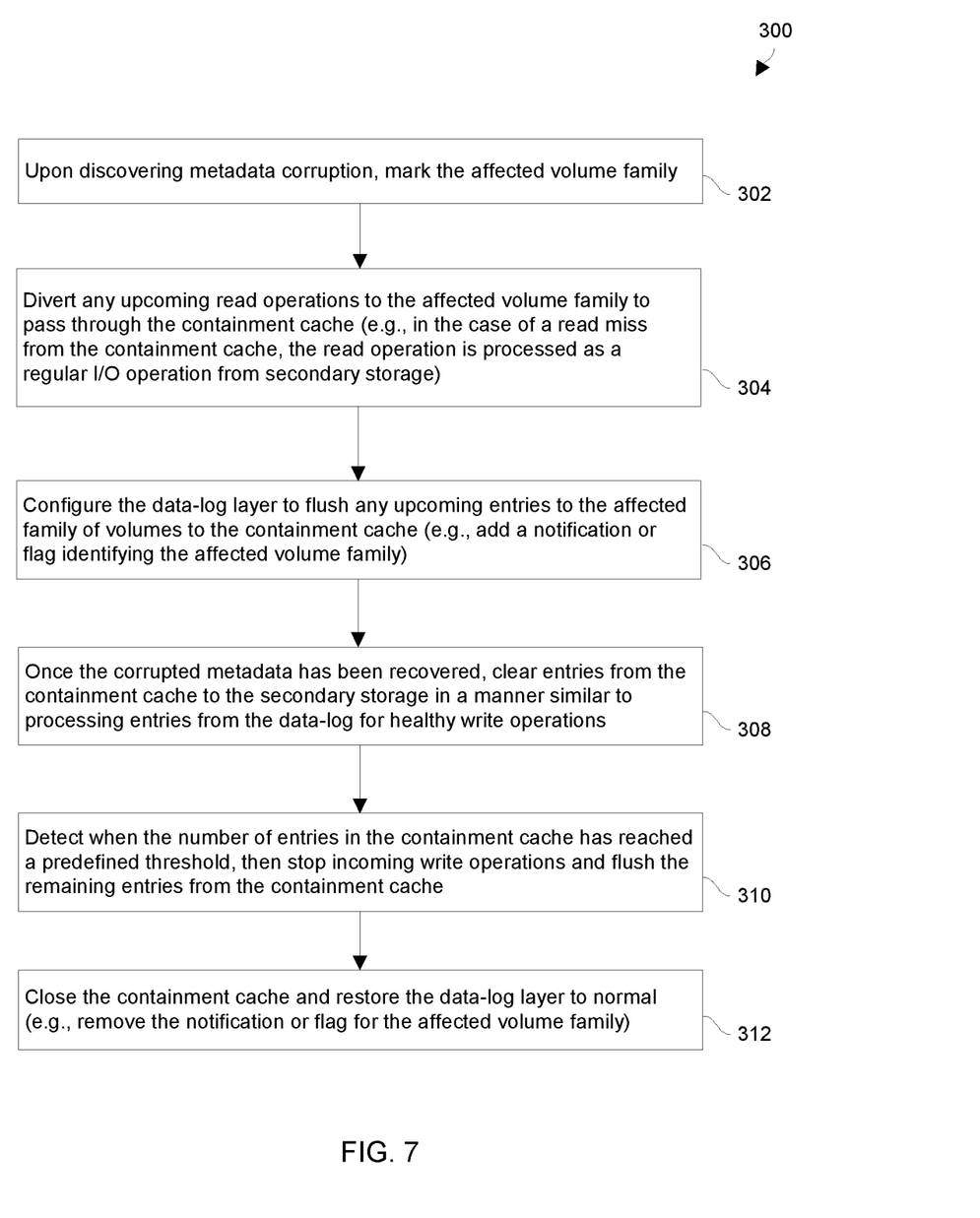
FIG. 7 is a flowchart of a procedure providing particular details of the data storage environment of FIG. 1 in accordance with certain embodiments.

FIGS. 6 and 7 show flowcharts for further details of the data storage environment 20 (FIG. 1) in accordance with certain embodiments. FIG. 6 is a flowchart of a procedure 200 which is performed by the storage processing circuitry 40 for handling metadata corruption to avoid data unavailability. FIG. 7 is a flowchart of a procedure 300 suitable for a particular activity in the procedure 200.

With reference to FIG. 6, at 202, the storage processing circuitry 40 performs metadata evaluation operations on metadata describing pages of written data in a data-log that holds data en route to volumes in secondary storage. Along these lines, the data-log may hold entries of page descriptor/page buffer pairs for processing in time order to preserve data consistency. Metadata of the page descriptors includes, among other things, addresses to be written and, based on this metadata, the storage processing circuitry 40 determines whether the data in the associated page buffer is for deduplication, overwriting existing data, or should be written as new data.

At 204, while results of the metadata evaluation operations indicate that there is no corrupt metadata, the storage processing circuitry 40 flushes the pages of written data from the data-log to the volumes in the secondary storage. Along these lines, the secondary storage may include multiple volumes for various purposes, e.g., for different host computers, for different host applications, for snapshots, etc. Accordingly, some volumes may be related or have data in common (e.g., a volume family) while other volumes are independent of each other.

At 206, in response to a result of a particular metadata evaluation operation indicating that metadata for a particular page of written data in the data-log is corrupt, the storage processing circuitry 40 quarantines the particular page of written data from the data-log to a containment cache to enable further flushing of other pages of written data from the data-log to the volumes in the secondary storage. Such quarantining of the particular page from the data-log prevents the data-log from backing up (i.e., filling up with written data). Instead, the storage processing circuitry 40 is able to continue processing further pages of written data through the data-log. FIG. 7 shows particular details of such further processing.

As shown in FIG. 7, the storage processing circuitry 40 performs a procedure 300 to continue processing entries 150 from the data-log (also see FIGS. 3 through 5) by quarantining an unhealthy entry 150 (i.e., a particular page with corrupt metadata) from the data-log to the containment cache. Such operation provides high availability enabling the host computers 22 of the data storage environment 20 to continue operating.

In particular, at 302, upon discovering that an entry 150 has corrupt metadata, the storage processing circuitry 40 marks the affected volume family. For example, the storage processing circuitry 40 may set a flag, store volume identification information in a control area, etc.

At 304, the storage processing circuitry 40 diverts any upcoming read operations to the affected volume family to pass through the containment cache. In the case of a read miss from the containment cache, the storage processing circuitry 40 processes the read operation as a regular I/O operation from the secondary storage.

At 306, the storage processing circuitry 40 configures the data-log layer (e.g., part of the host-side circuitry 110 and/or the storage-side circuitry 130, also see FIG. 3) to flush any upcoming entries 150 to the affected family of volumes from the data-log to the containment cache. At this point, the storage processing circuitry 40 may add a notification (e.g., a flag, configuration data, etc.) identifying the affected family of volumes.

At 308, once the corrupted metadata has been restored, the storage processing circuitry 40 begins clearing entries 150 from the containment cache to the secondary storage. Such operation is similar to that when the storage processing circuitry 40 clears entries 150 from the data-log to the secondary storage in that the storage processing circuitry 40 determines whether the written data is for deduplication, overwriting existing data, or writing as new data, and so on.

At 310, the storage processing circuitry 40 detects when the number of entries 150 in the containment cache has reached a predetermined threshold, and then stops incoming write operations and flushes the remaining entries from the containment cache. Alternatively, the storage processing circuitry 40 may simply continue processing entries 150 from the containment cache until the containment cache is empty.

At 312, the storage processing circuitry 40 closes the containment cache and restores the data-log layer to normal. In particular, the storage processing circuitry 40 removes the notification for the affected volume family so that all entries 150 are processed through the data-log without using the containment cache.

As described above, improved techniques are directed to handling metadata corruption in data storage equipment 24 to avoid data unavailability. Such techniques involve processing pages of written data from a data-log 62 based on respective metadata, and quarantining a page of written data along with a page of underlying metadata for that page of written data from the data-log 62 to a containment cache 64 if the page of underlying metadata is corrupt. The data-log 62 may serve as a transactional log of operations (e.g., host I/O requests 30) which preserves write order and from which I/O requests are processed. With the triggering page of written data and corresponding page of metadata quarantined from the data-log 62, the data storage equipment can continue processing other pages from the data-log 62. For example, suppose that the quarantined page of written data (i.e., the trigger page) targets a particular family of volumes in secondary storage 140. In such a situation, the data storage equipment 24 can continue processing pages containing written data en route to non-related volumes in secondary storage 140 directly from the data-log 62. Additionally, the data storage equipment 24 can quarantine further pages targeting the affected volume family to the containment cache 64 until the corrupted metadata is restored. As a result, the data storage equipment 24 may provide extended data availability (e.g., remain operational until the metadata restored, allow further processing through the data-log 62, etc).

One should appreciate that the above-described techniques do not merely store data. Rather, the disclosed techniques involve improvements to the technology of data storage. For example, with the techniques disclosed herein, particular advantages are available such as enabling host computers 22 to continue to access data from the data storage equipment 24 even after the data storage equipment 24 encounters corrupted metadata for an entry 150 in the data-log, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in some situations, storage devices may get metadata corruptions caused by either software bugs or non-fatal hardware failures. In a log-structured system that process the data in time order, a single metadata corruption can mandate the processing of the log to stop and so the whole appliance will fail, blocking any new IO requests until recovery is complete. This means that a single corruption or non-recoverable error will result in complete data unavailability for the user.

Consider a component "Transactional data-log" (or data-log). This component may store user IO requests in the form of a pair: Page Buffer—containing the actual page, and Page Descriptor—holding relevant meta-data such as the requested address to be written. The data-log component is backed by a persistent storage layer, and acts as a "write cache"—user writes need to be stored to it, and I/O is then released to the user as acknowledged (the data being written in a time orderly manner). A background process goes over this data-log and flushes its content into an underlying large storage layer that stores the pages.

If the background process fails to flush a corrupted page, it would not be able to skip it since there is a hard requirement for sequential time ordering processing. The order is a hard requirement since if there are dependencies between consecutive I/Os, they must be done in the order they were received. In case of metadata corruption, the data-log may fail flushing an entry, since flushing to the underlying storage layer is done in read-modify-write scheme (Each page write only changes a part of one or more metadata pages, not a full page). If reading the old metadata page fails due to a corruption, flush will fail, and the data-log will not be emptied. Shortly after—the data-log will be filled up and no new requests may be handled, causing the appliance or device to crash.

Recovery from such a crash can be done only after this metadata corruption is fixed. A particular solution involves scanning across all the meta-data layer, which takes a considerable amount of time. Until this is done—the appliance would remain offline.

To address the problem above—a method for a storage system to contain metadata corruption and avoid any data unavailability is provided.

In accordance with certain embodiments, the purpose of such an improvement is to contain any metadata errors to only affect behavior of this volume and its snapshot tree (a volume and the snapshot tree it is part of, if exists, can be referenced as "volume family"). Such an improvement may have minimal effect on the user, i.e., the user will still be able to write to the whole appliance address space, and read to all addresses not directly affected by this corruption.

Such containment is done by adding a containment area into the appliance or device. This quarantine effectively acts as a second tier to the data-log (which acts as a "write cache"), and allows data-log to flush erroneous entries to it without breaking the write order assumption.

Other solutions for fault containment in storage devices allow for reads during recovery, but certain improvements disclosed herein also allow writes. Such improvements may have a big impact for a client, e.g., an application running over block storage often crash and cannot even mount a volume if writes to it are blocked. Allowing even a small amount of writes allows the user to exit gracefully, or to migrate the volume to a healthy appliance until it is recovered.

In accordance with certain embodiments, a containment layer is added to which the data-log will flush any entry belonging to the volume family. The containment cache comprises two components: (i) a containment store where the entries are persisted. Each entry includes a Page Descriptor—Page Buffer pair on a persistent media and (ii) a containment index which is a volatile in-memory index that stores mapping between addresses and the corresponding pair in the store. The sizes of these components are limited.

The containment cache may have limited space and degraded performance. It only needs to hold enough data to fulfill the user writes to the affected volume family. There are two challenges here:

1. Flushes to containment cache are not optimized (each dump will require a write to disk, no amortization). The whole appliance can get degraded performance since this is a lot of work.

2. The size of the containment cache can be much larger than the original log, however, it is still limited by the allocated persistent storage and volatile space allocated to hold the index.

To address these challenges, and ensure optimal performance for other non-affected volumes, a Quality of Service (QOS) mechanism may be provided. Along these lines, it is possible to tune the QOS mechanism to allow only a slow stream of writes I/O to the affected volume family, while still allowing high performance for all other volumes. Along these lines, the storage processing circuitry 40 may keep the I/O rate to the affected family low enough so that the containment cache holds enough data to satisfy writes to this volume family for the time it takes for the metadata to be restored, e.g., the time for Family FSCK to run.

In accordance with certain embodiments, keeping volumes available during recovery is as follows:

1. Upon discovering a metadata corruption or non-recoverable error, mark the affected volume family 2. Divert any upcoming reads from that volume family to pass through the containment cache. In case of read miss from the containment cache, the system issues a regular I/O from the underlying storage.

3. Notify the data-log layer to flush any upcoming entries belonging to the family—to the containment cache.

4. Once the corrupted metadata page has been recovered, start clearing entries from the containment cache to the underlying storage by the same way as data-log does for healthy writes.

5. Since this is a race between the flush process and new user writes, continue processing entries from the containment cache until there is low amount of entries in the containment cache.

6. Once there is a low amount of entries in the containment cache (e.g., under a predefined threshold), stop the incoming user writes, and flush the reminder entries from the containment cache to the underlying storage.

7. Close the containment cache and remove notifications for the corrupted volume family.

Accordingly, such processing allows the user to write new data on corrupted volume. Additionally, such processing gives the user the ability to schedule the recovery process to a most suitable time for him. Furthermore, a long lock on the affected volume is avoided (i.e., there is simply a narrow the lock to a small time frame that should be undetected by the user.

Additionally, in some arrangements, the objects within the secondary storage 140 are not volumes but other data storage objects such as files systems, files, LUNs, files holding volumes, volumes holding files, virtual volumes, other types of containers, combinations thereof, etc. Moreover, in some arrangements, the data that is stored within the secondary storage 140 may be stored in SSDs exclusively, tiered storage, mapped RAID, undergo compression, undergo deduplication, combinations thereof, and so on.

Furthermore, in some arrangements, quarantining of entries 150 from the data-log 62 was described as being in response to detection of corrupt metadata. However, one should appreciate that such operation can be applied to other situations such as encountering a non-recoverable error in the data.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of handling metadata corruption to avoid data unavailability, the method comprising:
performing metadata evaluation operations on metadata describing pages of written data in a data-log that holds data en route to volumes in secondary storage;
while results of the metadata evaluation operations indicate that there is no corrupt metadata, flushing the pages of written data from the data-log to the volumes in the secondary storage;
in response to a result of a particular metadata evaluation operation indicating that metadata for a particular page of written data in the data-log is corrupt, quarantining the particular page of written data from the data-log to a containment cache to enable further flushing of other pages of written data from the data-log to the volumes in the secondary storage, the particular page belonging to a first family of volumes;
while the particular page of written data is quarantined in the containment cache, quarantining other pages of written data en route to the first family of volumes from the data-log to the containment cache; and
while pages of written data en route to the first family of volumes are quarantined in the containment cache, decreasing an input rate for receiving data en route to the first family of volumes from a set of host computers to prevent the containment cache from becoming full.

2. A method as in claim 1 wherein the volumes in the secondary storage include the first family of volumes and a second family of volumes that is independent of the first family of volumes;
wherein quarantining the particular page of written data includes:
ascertaining that the particular page of written data is en route to the first family of volumes, and
moving the particular page of written data from the data-log to the containment cache to allow further flushing of pages of written data en route to the second family of volumes from the data-log to the second family of volumes.

3. A method as in claim 2, further comprising:
while the particular page of written data resides in the containment cache, flushing pages of written data en route from the data-log to families of volumes other than the first family of volumes, the families of volumes other than the first family of volumes including the second family of volumes.

4. A method as in claim 3, further comprising:
while pages of written data en route to the first family of volumes are quarantined in the containment cache, retrieving a page that belongs to the first family of volumes from the secondary storage to satisfy a read operation that results in a read miss.

5. A method as in claim 3, further comprising:
while pages of written data en route to the first family of volumes are quarantined in the containment cache, retrieving a page that belongs to the first family of volumes from the containment cache to satisfy a read operation that results in a read hit.

6. A method as in claim 3, further comprising:
in response to recovery of the metadata for the particular page, flushing pages of written data from the containment cache to the first family of volumes.

7. A method as in claim 6, further comprising:
after the metadata for the particular page has been recovered and while pages of written data are being flushed from the containment cache to the first family of volumes, continuing to quarantine further pages of written data en route to the first family of volumes from the data-log to the containment cache.

8. A method as in claim 6, further comprising:
after the metadata for the particular page has been recovered and while pages of written data are being flushed from the containment cache to the first family of volumes, monitoring a current number of pages of written data remaining in the containment cache, and
in response to the current number of pages of written data remaining in the containment cache dropping below a predefined threshold, temporarily blocking receipt of data from a set of host computers until all of the pages of written data remaining in the containment cache are flushed from the containment cache to the first family of volumes.

9. A method as in claim 8, further comprising:
in response to all of the pages of written data remaining in the containment cache being flushed from the containment cache to the first family of volumes, unblocking receipt of data from the set of host computers and closing the containment cache to prevent further quarantining of pages of written data en route to the first family of volumes.

10. A method as in claim 3, further comprising:
while pages of written data en route to the first family of volumes are quarantined in the containment cache, maintaining an input rate for receiving data en route to the second family of volumes from a set of host computers to maintain quality of service to the second family of volumes.

11. A method as in claim 3 wherein the data-log is disposed along a data path of a data storage assembly which is constructed and arranged to perform data storage operations on behalf of a set of host computers.

12. A method as in claim 1 wherein the data-log is disposed along a data path of a data storage assembly which is constructed and arranged to perform data storage operations on behalf of a set of host computers; and
wherein flushing the pages of written data from the data-log to the volumes in the secondary storage includes:
processing the pages of written data from the data-log in a write order preserving manner along the data path.

13. A method as in claim 12 wherein processing the pages of written data from the data-log in the write order preserving manner along the data path includes:
forwarding the pages of written data from the data-log in the write order preserving manner to a mapper circuit that manages the written data within the secondary storage in accordance with a mapped (redundant array of independent disk) RAID scheme.

14. A method as in claim 12 wherein performing the metadata evaluation operations on the metadata describing the pages of written data in the data-log includes:
ascertaining whether individual metadata items for respective pages are intact, each metadata item indicating an address to be written enabling the data storage equipment to determine whether a respective page should be involved in a deduplication operation, an overwrite operation or a new write operation.

15. A method as in claim 14 wherein the individual metadata items are constructed and arranged to support binary searching in a binary tree.

16. Data storage equipment, comprising:
memory; and
control circuitry coupled to the memory, the memory storing instructions which, when carried out by the control circuitry, cause the control circuitry to:
perform metadata evaluation operations on metadata describing pages of written data in a data-log that holds data en route to volumes in secondary storage,
while results of the metadata evaluation operations indicate that there is no corrupt metadata, flush the pages of written data from the data-log to the volumes in the secondary storage,
in response to a result of a particular metadata evaluation operation indicating that metadata for a particular page of written data in the data-log is corrupt, quarantine the particular page of written data from the data-log to a containment cache to enable further flushing of other pages of written data from the data-log to the volumes in the secondary storage, the particular page belonging to a first family of volumes;
while the particular page of written data is quarantined in the containment cache, quarantine other pages of written data en route to the first family of volumes from the data-log to the containment cache; and
while pages of written data en route to the first family of volumes are quarantined in the containment cache, decrease an input rate for receiving data en route to the first family of volumes from a set of host computers to prevent the containment cache from becoming full.

17. A computer program product having a non-transitory computer readable medium which stores a set of instructions to handle metadata corruption to avoid data unavailability; the set of instructions, when carried out by computerized circuitry, causing the computerized circuitry to perform a method of:
performing metadata evaluation operations on metadata describing pages of written data in a data-log that holds data en route to volumes in secondary storage;
while results of the metadata evaluation operations indicate that there is no corrupt metadata, flushing the pages of written data from the data-log to the volumes in the secondary storage;
in response to a result of a particular metadata evaluation operation indicating that metadata for a particular page of written data in the data-log is corrupt, quarantining the particular page of written data from the data-log to a containment cache to enable further flushing of other pages of written data from the data-log to the volumes in the secondary storage, the particular page belonging to a first family of volumes;
while the particular page of written data is quarantined in the containment cache, quarantining other pages of written data en route to the first family of volumes from the data-log to the containment cache; and
while pages of written data en route to the first family of volumes are quarantined in the containment cache, decreasing an input rate for receiving data en route to the first family of volumes from a set of host computers to prevent the containment cache from becoming full.

18. Data storage equipment as in claim 16 wherein the volumes in the secondary storage include the first family of volumes and a second family of volumes that is independent of the first family of volumes;
wherein the control circuitry, when quarantining the particular page of written data, is constructed and arranged to:
ascertain that the particular page of written data is en route to the first family of volumes, and
move the particular page of written data from the data-log to the containment cache to allow further flushing of pages of written data en route to the second family of volumes from the data-log to the second family of volumes.

19. A computer program product as in claim 17 wherein the volumes in the secondary storage include the first family of volumes and a second family of volumes that is independent of the first family of volumes;
wherein quarantining the particular page of written data includes:
ascertaining that the particular page of written data is en route to the first family of volumes, and
moving the particular page of written data from the data-log to the containment cache to allow further flushing of pages of written data en route to the second family of volumes from the data-log to the second family of volumes.

20. A computer program product as in claim 17 wherein the data-log is disposed along a data path of a data storage assembly which is constructed and arranged to perform data storage operations on behalf of a set of host computers; and
wherein flushing the pages of written data from the data-log to the volumes in the secondary storage includes:
processing the pages of written data from the data-log in a write order preserving manner along the data path.

* * * * *